United States Patent [19]

Grapenthin

[11] Patent Number: 5,319,512
[45] Date of Patent: Jun. 7, 1994

[54] POSITIONING DEVICE FOR POSITIONING A READ/WRITE HEAD OF A DISC STORAGE SYSTEM

[76] Inventor: Hans Grapenthin, Blumenstrasse 16, 8951 Westendorf, Fed. Rep. of Germany

[21] Appl. No.: 120,709

[22] Filed: Sep. 13, 1993

Related U.S. Application Data

[63] Continuation of Ser. No. 722,047, Jun. 27, 1991, abandoned.

[30] Foreign Application Priority Data

Jun. 29, 1990 [DE] Fed. Rep. of Germany ....... 4020876

[51] Int. Cl.$^5$ .............................................. G11B 5/55
[52] U.S. Cl. .................................................... 360/106
[58] Field of Search ............. 360/106, 105, 104, 99.08

[56] References Cited

U.S. PATENT DOCUMENTS

| 4,805,055 | 2/1989 | Wright . |
| 4,870,525 | 9/1989 | Wong et al. . |
| 4,996,623 | 2/1991 | Erpelding .......................... 360/104 |

FOREIGN PATENT DOCUMENTS

| 254558 | 7/1987 | European Pat. Off. . |
| 334650 | 3/1989 | European Pat. Off. . |
| 463631 | 6/1991 | European Pat. Off. . |

OTHER PUBLICATIONS

Patent Abstracts of Japan, vol. 4, No. 153, p. 33, 635, Oct. 25, 1980, & JP-A-55 101163 (Nippon Denshin Denwa Kosha) Aug. 1, 1980–whole document.
Patent Abstracts of Japan, vol. 11, No. 129 (P-570) Apr. 23, 1987, & JP-A-61 271678 (NEC Corp) Dec. 1, 1986–whole document.
Patent Abstracts of Japan, vol. 13, No. 207 (E-758), May 16, 1989, & JP-A-01 023756 (Hitachi Ltd.) Jan. 26, 1989–whole document.
Research Disclosure, Ref. no. 30383, No. 303, Jul. 1989, New York, USA p. 536 "Electrically Plugable HSA--to-Actuator Configuration", p. 539, lines 9-10, FIG. 1.

*Primary Examiner*—A. J. Heinz
*Attorney, Agent, or Firm*—Albert P. Cefalo; Ronald C. Hudgens; Barry N. Young

[57] ABSTRACT

A head positioning device in a disc storage system is constructed of individual flat components, particularly of ceramics which are individually ground or lapped to their final dimensions before connected with one another. Individually, the flat components comprise positioning arms, spacers and carrier arms. Head carriers are fixed to the free ends of the head positioning arms by means of pins of memory metal permitting removal of the head carriers. Read/write heads for recording and retrieving information are fixed to the removable head carriers. The carrier arms are arranged for receiving positional magnetic units. The spacers are arranged between the positioning arms and the carrier arms.

2 Claims, 3 Drawing Sheets

POSITIONING DEVICE FOR POSITIONING A READ/WRITE HEAD OF A DISC STORAGE SYSTEM

This application is a continuation of application Ser. No. 07/722,047, filed Jun. 27, 1991, now abandoned.

FIELD OF THE INVENTION

This invention relates to a positioning device for a disc storage system and, more particularly to a head positioner device having a plurality of positioning arms with read/write heads mounted thereon, for accessing information on magnetic or optical discs.

BACKGROUND OF THE INVENTION

In disc storage systems, as technical development continuously moves to higher storage capacities, the mechanical construction of the head positioner device must likewise be improved. A typical high capacity disc storage system includes a plurality of discs which are stacked on a centrally located spindle. Compact construction of the device requires minimal disc separation between the stacked discs. Fast access to the information stored on the discs requires a low inertia positioner with a short settling time and good damping characteristics after positioning. With a fast servo for positioning, the positioner should be constructed to have high resonant frequencies with good signal following properties and a short response time. Two different types of positioning devices are known: namely, linear positioners and rotational positioners.

A linear positioner is moved radially with respect to the disc by means of an actuator pulse system during track selection. A rotational positioner is rotatably mounted on a positioning axis arranged parallel to the axis of the disc stack. The rotational positioner has on one side of the positioning axis positioning arms for carrying the read/write heads and on the other side of the positioning axis a pair of carrier arms. The carrier arms carry either a coil which influences a fixed magnet or a magnet, in which case the coil is fixed.

In more recent constructions of a positioner device, a monolithic body with integral positioning arms and integral carrier arms has been used, which is conventionally known as an "E-block". Such an E-block has the advantage that smaller inner stresses arise and the number of connections is minimized, so that the time required to position the arm is short.

With increasing miniaturization of the disc storage system and the positioning device, the manufacture of a monolithic E-block is, however, exceptionally difficult, laborious and accordingly expensive.

It accordingly is the problem of the invention to create a positioner in which the advantages of the monolithic E-block can essentially be maintained but in which the necessary high precision of the complex structure can be achieved in a simpler and accordingly more cost favorable fashion.

SUMMARY OF THE INVENTION

This problem is essentially solved in accordance with the invention in that the E-block is composed of flat constructional component pieces which are arranged parallel to one another, wherein neighboring constructional components are connected with one another, and in that the flat constructional components comprise first components which form positioning arms and second components which form spacers arranged between the individual positioning arms. Preferably, in the case of the construction of a rotational positioning device, the flat components include, furthermore, third components which form carrier arms for the magnet unit.

The E-block constructed in accordance with the invention has the advantage that the individual flat components are simply manufactured at a favorable cost with a high degree of precision. The components can further be ground or lapped to the highest tolerances.

After the positioning arms, the carrier arms and the spacers have been manufactured, the individual components are assembled together into a stack forming the E-block by connecting the components with one another using conventional connecting techniques, by way of example, adhesion or soldering depending upon the material used. If adhesion is chosen as the connection technique, cyanoacrylates, epoxy resins or polyurethanes can be used as the adhesive.

A head carrier for mounting the read/write head is normally fixed to the distal free end of each positioning arm by means of welding, bosses, studs or the like. Permanently adhering the head carrier to the positioning arm has the disadvantage that further working of the arm is not readily possible. Using bosses to fasten the head carrier to the positioning arm is in any case problematic because of the high stiffness and low tensile strength of ceramic materials. In a particularly preferred further development of the invention, it is accordingly provided that the head carriers for the read/write heads be fixed to the positioning arms by means of pins manufactured of a memory metal. Local cooling of the pin permits the detachment of the head carrier from the positioning arm.

With the present invention, the monolithic E-block, which is normally made of aluminum or magnesium, can be replaced by a structure of parallel plate-like stacked elements, particularly of a ceramic material, wherein by suitable working of the individual plate-like elements in a comparatively simple and cost favorable fashion, a complex structure with high precision can be made. The advantages of a monolithic structure of the E-block in accordance with the state of the art is essentially maintained, particularly the structural modes. The lighter weight and higher stiffness of the ceramic material give additional advantages over the known constructions with respect to resonances, inertial forces and settling in time. An additional advantage emerges in that with just a few types of component, namely positioning arms, carrier arms and spacers, the most varied structures can be manufactured.

DETAILED DESCRIPTION OF THE PREFERRED EMBODIMENT

Figure 1:
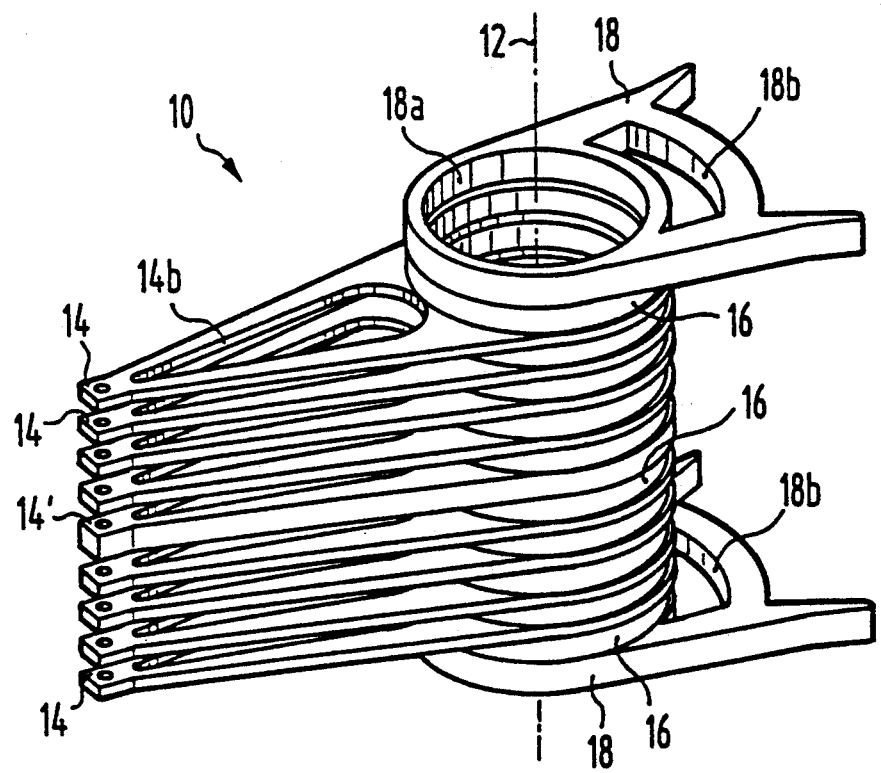
FIG. 1 is a perspective diagram of the head positioning device (E-block) of a disc storage system in accordance with the invention.

In a not-illustrated housing of a disc storage system of known construction, a head positioning device indicated overall with the reference number 10 in FIG. 1, a so-called E-block, is rotatably mounted about an axis 12. The E-block 10 comprises parallel positioning arms 14 spaced one below the next, spacers 16, as well as carrier arms 18. As is evident from FIGS. 1 and 2, the positioning arms 14, the spacers 16 and the carrier arms 18 form a stack of parallel components which, in the case of the embodiment described, are manufactured of a ceramic material and are fixed to one another by means of soldering. The positioning arms 14 and the spacers 16 are arranged alternately. Outer carrier arms 18 for mounting magnetic coils o magnets for position the E-block 10, are arranged diametrically opposed to the positioning arms 14 with respect to the axis 12 and are positioned at the top and bottom of the stack of parallel components.

Figure 2:
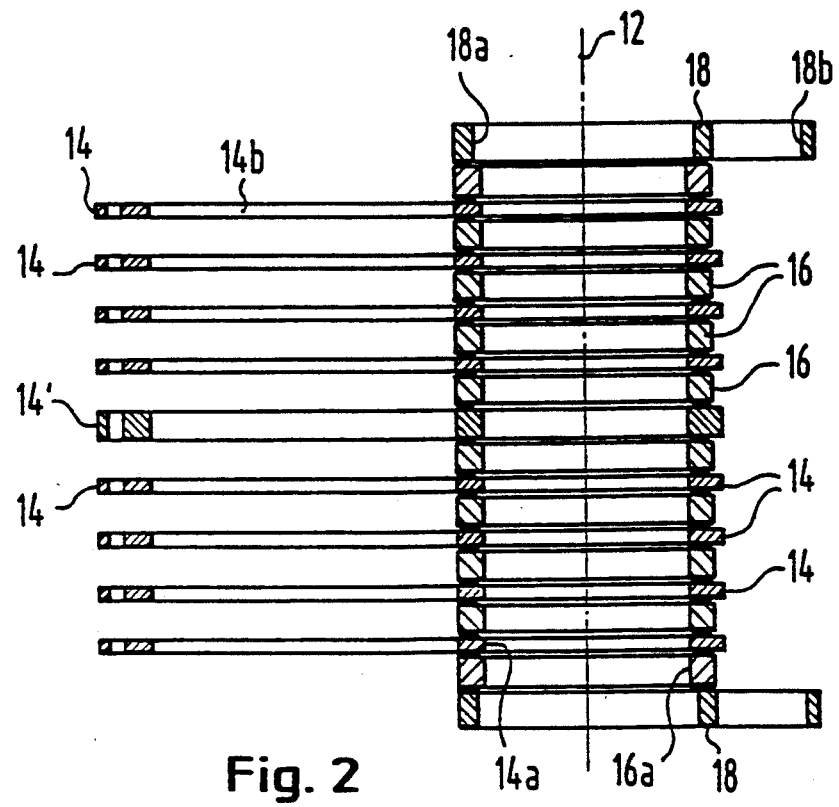
FIG. 2 is a vertical section through the E-block along line 1—1 of FIG. 1.

Components 14, 16, and 18 all have a section adjacent the axis 12 which has a central circular throughhole 14a, 16a and 18a respectively, as shown in FIG. 2. All throughholes 14a, 16a and 18a are arranged concentrically with respect to the axis 12. The throughholes 14a and 16a, of the positioning arms 14 and spacers 16 respectively, each have the same diameter, while the diameter of the throughholes 18a in the carrier arms 18 is somewhat larger. The throughholes 18a and the carrier arms 18 each serve for the receipt of a not illustrated bearing by means of which the E-block 10 is rotatably mounted around the axis 12.

The thickness of the individual components 14, 16 and 18 can vary depending upon the requirements; as is evident, for example, from FIGS. 1 and 2 in the illustrated embodiment the thickness of the center servo positioning arm 14' is greater than the thickness of the remaining positioning arms.

The size of the throughholes 14a and 16a is so chosen that the abutting surfaces of neighboring components are sufficiently large to permit precise registration of the components and to guarantee secure connection of neighboring components; on the other hand, the throughholes 14a and 16a and 18a should be constructed as large as possible in order to reduce the mass of the E-block 10 as much as possible. Apertures 14b and 18b respectively in positioning arms 14 and the carrier arms 18 also serve to reduce the mass of the E-block 10.

The individual components 14, 16 and 18 can be made by injection molding and then subsequently worked, particularly by lapping, in order to provide components with exceptionally close tolerances. The individual components are then stacked in the required sequence and are simultaneously centered, wherein, on account of their lapped surfaces, the radial position with reference to the axis 12 adjusts itself. The exact angular position of the positioning arms 14 and the carrier arms 18 can be adjusted via reference surfaces, for example via the distal free end surface of each positioning arm 14 or by means of a given side surface of the positioning arm 14. In the so-adjusted configuration, the individual components 14, 16 and 18 are then connected with one another, by way of example, by means of soldering.

Materials suitable for the manufacture of the flat components include metals, fiber reinforced plastics and also particularly, ceramics. The individual flat elements such as positioning arms 14, carrier arms 18 and spacers 16 can, in the case of a metal, be made by pressing, casting, forging or stamping, and, in the case of ceramics or plastics, by injection molding. Additionally, in the case of ceramic components isostatic pressing can also be used. With ceramic and metal materials the individual components can be cut out of flat plates by means of a laser. In all cases noted, the manufactured components are ground and/or lapped to their final thickness before assembly into the E-block 10.

In accordance with the invention, a particularly preferred material for the construction of the E-block 10 is ceramic. Ceramics are materials with a very high stiffness and comparatively low density from which decisive advantages emerge for the E-block 10 of the disc storage system: because of the lighter weight of the E-block 10 and the correspondingly smaller inertia, a storage system can be made with faster access time. Because of the stiffness of the ceramic material there also is a shorter settling time after positioning. In addition, with the E-block 10 constructed of ceramics, a storage system with an increased track density can be made. Due to higher resonant characteristics of ceramics the servo throughput frequency can be increased, resulting in a more rapid reaction to positional changes. A ceramic E-block 10 settles in on the track more rapidly allowing a narrower track edge. Moreover, as an advantage of using ceramic materials in the construction of the E-block 10 is that thinner positioning arms 14 can be manufactured having the same resonant characteristics as comparable thicker arms manufactured of a metallic material. By having thinner arms 14 the storage density of the system can be increased since the discs can be spaced closer to one and other. Suitable ceramic materials include, in particular, SiN, SiC, BC, $Al_2O_3$ and ZrO as well as mixtures of these ceramic materials.

Figure 3:
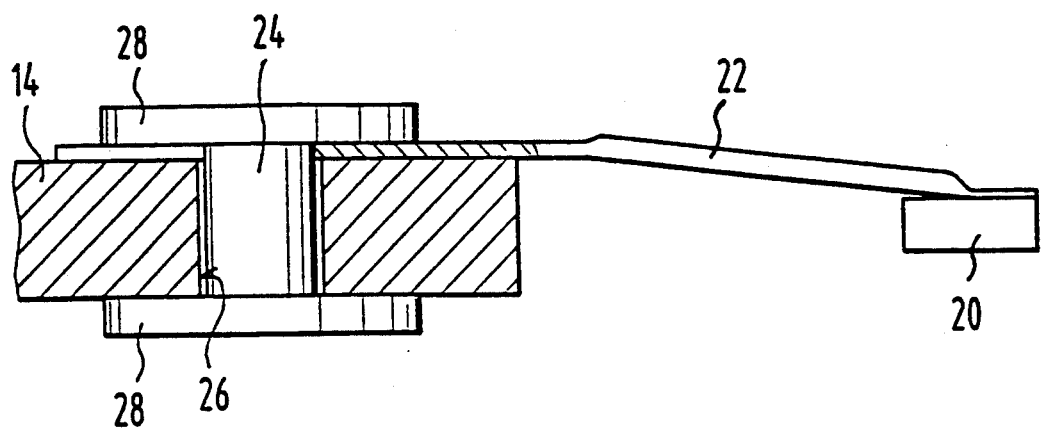
FIG. 3 is an enlarged vertical section through the distal free end of the positioning arm of FIG. 1 along line 1—1, including a head carrier having a read/write head mounted thereon
Figure 4:
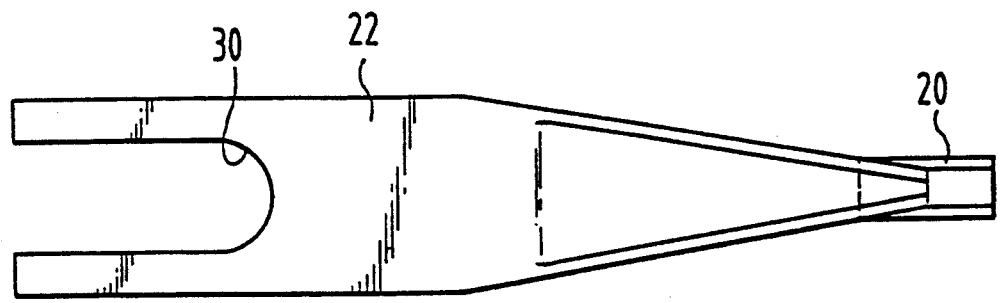
FIG. 4 is a plane view on the head carrier and the read/write head in accordance with FIG. 3.

As shown in FIGS. 3 and 4, a head carrier 22 for carrying a magnetic head 20 is fixed to the distal free end of the positioning arm 14, by a pin 24 of memory metal. The pin 24 is set in a corresponding borehole 26 in the end region of the positioning arm 14. The pin 24 has at each end an enlarged pin head 28. The head carrier 22, having an overall arm shape, carries the magnetic head 20 at its one free end, at its other end, the head carrier 22 is constructed in a forked a fashion so that a slot 30 arises. The width of the slot 30 is somewhat greater than the diameter of the pin 24 so that the forked end of the head carrier 22 can be pushed in between the pin head 28 and the oppositely lying surface of the positioning arm 14, laterally surrounding the pin 24, and can be clamped between the pin head 28 and the positioning arm 14.

The pin 24 consists of a memory metal such as, by way of, the alloys CuZnAl, CuAlNi or NiTi. At the normal operating temperatures of the storage system, the pin 24 clamps the head carrier 22 firmly between the pin head 28 and the positioning arm 14. On local cooling of the pin 24, the length of the pin 24 increases and the head carrier 22 can accordingly be removed, exchanged or readjusted.

Such a pin 24, which is normally in an austenitic phase, lengthens on cooling below a transition temperature Ms. At such a low temperature the memory metal of the pin 24 is in a martensitic phase. The transition temperature Ms must lie below the lowest operating or storage temperature of the storage system. The pin 24 must first, for example, be heated electrically up to the conversion temperature Af, whereby the memory effect is initiated by a phase transition into the austenitic phase. The pin 24 thereafter attempts to pull itself back again to its original shape and thereby transfers the holding force to the head carrier 22. For releasing the fixing, the pin 24 is locally cooled, whereon it expands itself again.

Figure 5:
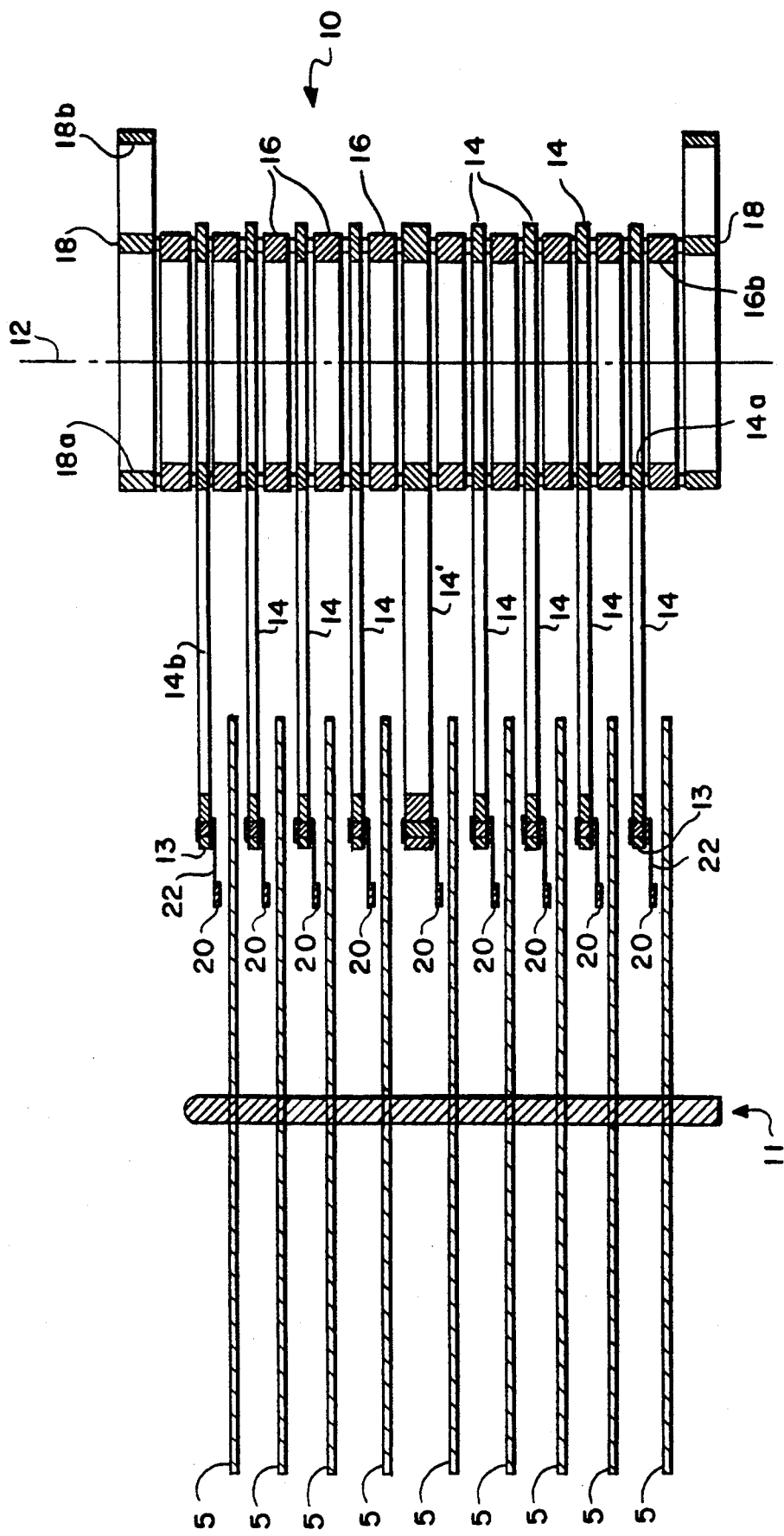
FIG. 5 is a vertical section through the disc storage system including a plurality of rotatably mounted discs and the positioning device of FIGS. 1-4.

Now in conclusion, and with reference to FIG. 5, what is described herein is a positioning device 10 for use with a disc storage system 11. The disc storage system 11 is conventional having a plurality of discs 5 rotatably mounted. Disc storage systems having a plurality of discs are well known to one skilled in the art.

The positioning device 10 comprises a plurality of plate-like components 14, 16, and 18 arranged parallel to one another in a stack having an axis 12. The stack when vertically oriented having a top and a bottom. Adjacent pairs of the plurality of components 14, 16, and 18 are connected with one another.

The plurality of components 14, 16, and 18 further to include a plurality of positioning arms 14. Each of the plurality of positioning arms 14 having a free end, generally indicated by reference numeral 13.

The plurality of components 14, 61, and 18 further to include a first carrier arm 18 arranged at the top of the stack and a second carrier arm 18 arranged at the bottom of the stack. The first and second carrier arms 18 for positioning the positioning device 10.

Furthermore, the plurality of components 14, 16, and 18 to include a plurality of spacers 16, one each of the plurality of spacers 16 arranged between the plurality of positioning arms 14, the first carrier arm 18, and the second carrier arm 18. Each of the plurality of spacers for separating the plurality of positioning arms 14, the first carrier arm 18, and the second carrier arm 18.

A head carrier 22 is mounted at the free end 13 of each of the positioning arms 14. A read/write head 20 is mounted on each head carrier 22. The read/write heads 20 are used to access information on the discs 5 of the disc storage system 11.

Although the present invention has been described in connection with a rotational positioner, it is to be understood that it can also be used in the case of a linear positioner. Furthermore, the positioning device in accordance with the invention can obviously also be used with advantage with an optical disc storage system.

While the present invention has been shown and described with particularity to a preferred embodiment therefore, it will be understood by those skilled in the art that the foregoing and other changes in form and detail may be made therein without departing from the spirit and scope of the present invention, and that the invention is not limited to this embodiment. The invention, therefore, is to be defined according to the following claims.

What is claimed is:

1. A positioning device (10) for accessing information stored in a disc storage system (11) having a plurality of discs (5) rotatably mounted, comprising:
   a plurality of plate-like components (14, 16, 18) arranged parallel to one another in a stack, said stack when vertically oriented with respect to an axis (12) having a top and a bottom, and wherein adjacent pairs of said plurality of components are connected with one another, said plurality of components include;
   a plurality of positioning arms (14), each of said plurality of positioning arms having a free end (13);
   a first carrier arm (18) arranged at said top of said stack;
   a second carrier arm (18) arranged at said bottom of said stack;
   said first and second carrier arms each comprising a ring-shaped portion, a pair of support members extending outwardly from said ring-shaped portion in generally the same direction, said pair of support members being located on a side of said ring-shaped portion opposite said positioning arms, and a bridge member for carrying magnetic coils extending between said pair of support members and being connected to said pair of support members intermediate their ends; and
   a plurality of spacers (16), one each of said plurality of spacers (16) arranged between said plurality of positioning arms (14), said first carrier arm (18), and said second carrier arm (18), said spacers (16) for separating said plurality of positioning arms (14), said first carrier arm (18), and said second carrier arm (18).

2. A positioning device for accessing information stored in a disc storage system having a plurality of disc rotatably mounted comprising:
   a plurality of plate-like components arranged parallel to one another in a stack, said stack when vertically oriented having a top and a bottom, and wherein adjacent pairs of said plurality of components are connected with one another, said plurality of components include;
   a plurality of positioning arms, each of said plurality of positioning arms having a free end;
   a first carrier arm arranged at said top of said stack;
   a second carrier arm arranged at said bottom of said stack;
   said first and second carrier arms each comprising a ring-shaped portion, a pair of support members extending outwardly from said ring-shaped portion in generally the same direction, said pair of support members being located on a side of said ring-shaped portion opposite said positioning arms, and a bridge member for carrying magnetic coils extending between said pair of support members and being connected to said pair of support members intermediate their ends;
   a plurality of spacers, one each of said plurality of spacers arranged between said plurality of positioning arms, said first carrier arm, and said second carrier arms;
   a head carrier mounted at said free end of each of said plurality of positioning arms;
   a read/write head mounted on each of said head carriers;
   said plurality of positioning arms to position said read/write heads;
   said first and second carrier arms to position said positioning device; and said spacers to separate said plurality of positioning arms, said first carrier arm, and said second carrier arm.

* * * * *